United States Patent
Leong et al.

(10) Patent No.: US 8,727,034 B2
(45) Date of Patent: May 20, 2014

(54) ROTARY POWER TOOL OPERABLE IN FIRST SPEED MODE AND A SECOND SPEED MODE

(75) Inventors: Chi Hoe Leong, Sungai Ara (MY); Seng Loong Ng, Bayan Lepas (MY); Daniel Brogli, Medan Lumbu Kuda (MY)

(73) Assignee: Robert Bosch GmbH, Stuttgart (DE)

( * ) Notice: Subject to any disclaimer, the term of this patent is extended or adjusted under 35 U.S.C. 154(b) by 975 days.

(21) Appl. No.: 12/530,817

(22) PCT Filed: Feb. 19, 2008

(86) PCT No.: PCT/EP2008/051970
§ 371 (c)(1),
(2), (4) Date: Sep. 29, 2010

(87) PCT Pub. No.: WO2008/110439
PCT Pub. Date: Sep. 18, 2008

(65) Prior Publication Data
US 2011/0036605 A1 Feb. 17, 2011

(30) Foreign Application Priority Data
Mar. 12, 2007 (EP) .................................... 07103965
Dec. 27, 2007 (EP) .................................... 07124099

(51) Int. Cl.
*E21B 1/14* (2006.01)
(52) U.S. Cl.
USPC .......................................... 173/217; 173/216
(58) Field of Classification Search
USPC ............................. 173/216, 217, 48, 213, 178
See application file for complete search history.

(56) References Cited

U.S. PATENT DOCUMENTS

| | | | | |
|---|---|---|---|---|
| 3,739,659 A * | 6/1973 | Workman, Jr. | ................ | 475/266 |
| 4,898,249 A * | 2/1990 | Ohmori | ........................ | 173/176 |
| 5,178,046 A * | 1/1993 | Matsumoto et al. | ......... | 81/57.14 |
| 5,954,144 A * | 9/1999 | Thames | ........................ | 173/216 |
| 5,967,934 A * | 10/1999 | Ishida et al. | .................. | 475/269 |
| 7,124,839 B2 | 10/2006 | Furuta et al. | | |

FOREIGN PATENT DOCUMENTS

GB 2 335 011 9/1999

* cited by examiner

Primary Examiner — Thanh Truong
Assistant Examiner — Nathaniel Chukwurah
(74) Attorney, Agent, or Firm — Michael Best & Friedrich LLP

(57) ABSTRACT

A rotary power tool operable in a first speed mode and a second speed mode comprising a motor shaft (6), a driveshaft (10) with an axis of rotation (42), a gear (24, 74) that is a component of a transmission (8) for transmitting torque from the motor shaft (6) to the driveshaft (10), a support member (48, 70), at least one bearing member (54, 76) which contacts the gear (24, 74), wherein the gear (24, 74), the support member (48, 70) and the at least one bearing member (54, 76) form an assembly that is in a first position along the axis of rotation (42) when the tool is operating in the first speed mode and is in a second position along the axis of rotation (42) when the tool is operating in the second speed mode, and wherein the at least one bearing member (54, 76) protrudes from the support member (48, 70) in the direction of the gear (24, 74) and rotates when the gear (24, 74) rotates.

14 Claims, 10 Drawing Sheets

ROTARY POWER TOOL OPERABLE IN FIRST SPEED MODE AND A SECOND SPEED MODE

This application is a National Stage Application of PCT/EP2008/051970, filed 19 Feb. 2008, which claims benefit of Serial No. 07103965.5, filed 12 Mar. 2007 in Europe and Serial No. 07124099.8, filed 27 Dec. 2007 in Europe and which applications are incorporated herein by reference. To the extent appropriate, a claim of priority is made to each of the above disclosed applications.

BACKGROUND

The present invention relates to rotary power tools and in particular to mechanisms for controlling the speed of a rotary power tool output shaft. U.S. Pat. No. 7,124,839 discloses a multi-speed transmission for a rotary power tool mediated by two sets of planetary gears. The speed of the output shaft is determined by adjusting the axial position of one of the ring gears. In a first axial position, the ring gear cannot rotate, so both planetary gear sets contribute to speed reduction, and the tool operates in low speed mode. In a second axial position, the ring gear is free to rotate and is coupled with the sun gear of the second planetary gear set. As a result, there is no speed reduction by the first set of planetary gears and the tool operates in a high speed mode.

Without support structures to stabilize this ring gear, it would be susceptible to vibration and vibration-associated noise. However support structures tend to introduce friction which generates heat as the ring gear rotates at high speeds. In the '839 patent, the inner surface of a precision ball bearing is provided to support smooth rotation of the ring gear while minimizing friction. A switching ring secures the outer surface of the ball bearing and provides means for adjusting the axial position of the ball bearing and ring gear assembly. A disadvantage of this solution is the high cost of the precision ball bearing used to stabilize the ring gear.

SUMMARY

It is therefore an object of this invention to overcome the disadvantages of the prior art by describing low cost means for stabilizing the gear that is used for switching speeds in a multi-speed transmission for a rotary power tool. The inventive rotary power tool is operable in a first speed mode and a second speed mode and has a motor shaft, a driveshaft, and a transmission for transmitting torque from the motor shaft to the driveshaft. The transmission includes a gear, which together with a support member and at least one bearing member which contacts the gear, form an assembly that is in a first position when the tool is operating in the first speed mode and is in a second position when the tool is operating in the second speed mode. The at least one bearing member protrudes from the support member in the direction of the gear.

This construction has the advantage that it is less expensive versus prior art solutions that utilize a precision ball bearing, wherein aspects of the ball bearing rotate around the gear rotational axis. Less precision is necessary since the bearing member remains in a relatively fixed position relative to the rotating gear and must not meet precise tolerances necessary for components that rotate around the gear axis. It is possible to have a support member made out of plastic, for example, which in single unitary structure would include a base structure, one or more bearing elements, and means for enabling the user to adjust the position of the support member so as to switch between speed modes.

The bearing member contacts the gear along an outer circumferential surface of the gear which is an ideal bearing surface for supporting the gear during high speed rotation of the gear.

The bearing member is separate from the support member and in such cases can rotate along its own axis of rotation when the support member is stationary. A bearing member that rotates will generate less friction than a stationary bearing. The wear on the bearing member is also less versus a stationary bearing.

The support member has a thickness and the bearing member axis of rotation is located within the support member thickness. This is accomplished by having a bearing member that is arranged in a recess in the support member. This construction has the advantage that the support member can provide good support for rotation of the bearing member, even when it is rotating at high speeds.

A cross section of the bearing member perpendicular to the bearing member axis of rotation may define a bearing member thickness that is about one half to three quarters of the support member thickness. The relative thickness of the support member versus the bearing member means there will be good structural support for the bearing member.

The support member is ring shaped. While other constructions are possible, this shape conforms the support member to the shape of the gear housing, so that the support member and associated support mechanism utilize little additional space in the gearbox, thereby advantageously minimizing size and weight of the gearbox and the rotary power tool.

The position of the bearing member and correspondingly its axis of rotation can be determined by cooperation of two members, the support member and the gear, since they form a cage for the bearing member. It is advantageous that no further parts or structural features are necessary to position the bearing members. The cage structure is inexpensively constructed by positioning the bearing member in a recess in the support member. A corresponding air gap ensures that the bearing members do not jam or clamp between the support member and the gear.

Contact between the gear and the bearing member is preferably limited to point or line contacts so as to minimize friction between the two parts and therefore advantageously minimize heat generation.

The tool can be conveniently operated in a third speed mode when the assembly is in a third position. Therefore, the present inventive design is sufficient to support a high speed mode, a low speed mode, and a neutral mode. In the high speed mode, the gear rotates at high speeds. In the neutral speed mode, the gear also rotates at high speeds but the planetary gear set of which it is a component does not transmit torque to the driveshaft. In the low speed mode, the gear is not free to rotate. The invention provides a solution to the problem of supporting the gear in all three modes even though the gear is positioned differently in each mode.

Inexpensive axial adjustment means can be provided by pins that are arranged in a circumferential groove in the gear. With this arrangement, a rotating sleeve can be used to urge the pins in one or the other axial direction so as to easily adjust the axial position of the assembly.

The support member of the present design can advantageously serve as a heat sink. In prior art designs, contact between the gear and the gear housing can lead to heat build-up in distinct regions of the housing. Other members that contact the gear could also become subject to localized heat generation. In the present invention, as the gear rotates, heat is generated from its contact with the bearing member and the pins that serve as axial adjustment means. Particularly if it is made of a conductive material, the support member can radiate the heat generated by friction between the gear and the bearing member and the pins, so that the heat is better distributed within the interior of the tool.

The inventive structure is intended to function when the gear is rotating, and particularly when it is rotating at high speeds. The invention does not interfere with the functioning of the gearbox when the tool is operating in a low speed mode wherein gear is not free to rotate.

In a possible embodiment, three bearing members are preferably used to position the gear. This configuration minimizes friction while still providing sufficient structural contact needed to maintain the radial position of the gear in the gearbox.

In an alternative embodiment, twelve bearing members are preferably used to position the gear. When there are more bearing members, each shares less of the load, so there will be less stress and wear on these components. Also when more bearing members are used, the gear is better stabilized and will vibrate less. That there are more possible points of contact means that any parts that are not manufactured to exact specifications will have less impact on the stabilization of the gear, so that failure of one or more bearing members will have a proportionally smaller impact. While the amount of friction with the ring gear is increased in this embodiment, the power losses to vibration tend to greater than the power loss associated with the friction, thereby outweighing this disadvantage.

The support member may be constructed of an inner heat conducting portion comprising heat sink means and an outer heat insulating portion comprising insulating means. This will better insulate the gearbox housing from heat generated from the support assembly and increase the time it would take for heat generated by the bearing members to radiate to the surface of the tool.

So that there is a better chance that vibration associated with different part categories may actually cancel each other, the number of planetary gears and the number of bearing members preferably do not share a common factor. That is, they are not multiples of a common number, so it is less likely that vibrational frequencies correspond in phase.

When possible, and particularly for small module gears, the number of planetary gears is preferably increased so as to better distribute the torque loads acting on the gear teeth 72.

It is advantageous if the axial adjustment means comprise inner and outer members that do not directly contact each other, since the inner member contacts the circumferential groove and generates heat, while the outer member is accessible to the user for adjustment. In this way, there will be less heat and vibration transmitted from the gears to the gear housing.

DETAILED DESCRIPTION OF THE PREFERRED EMBODIMENTS

Figure 1:
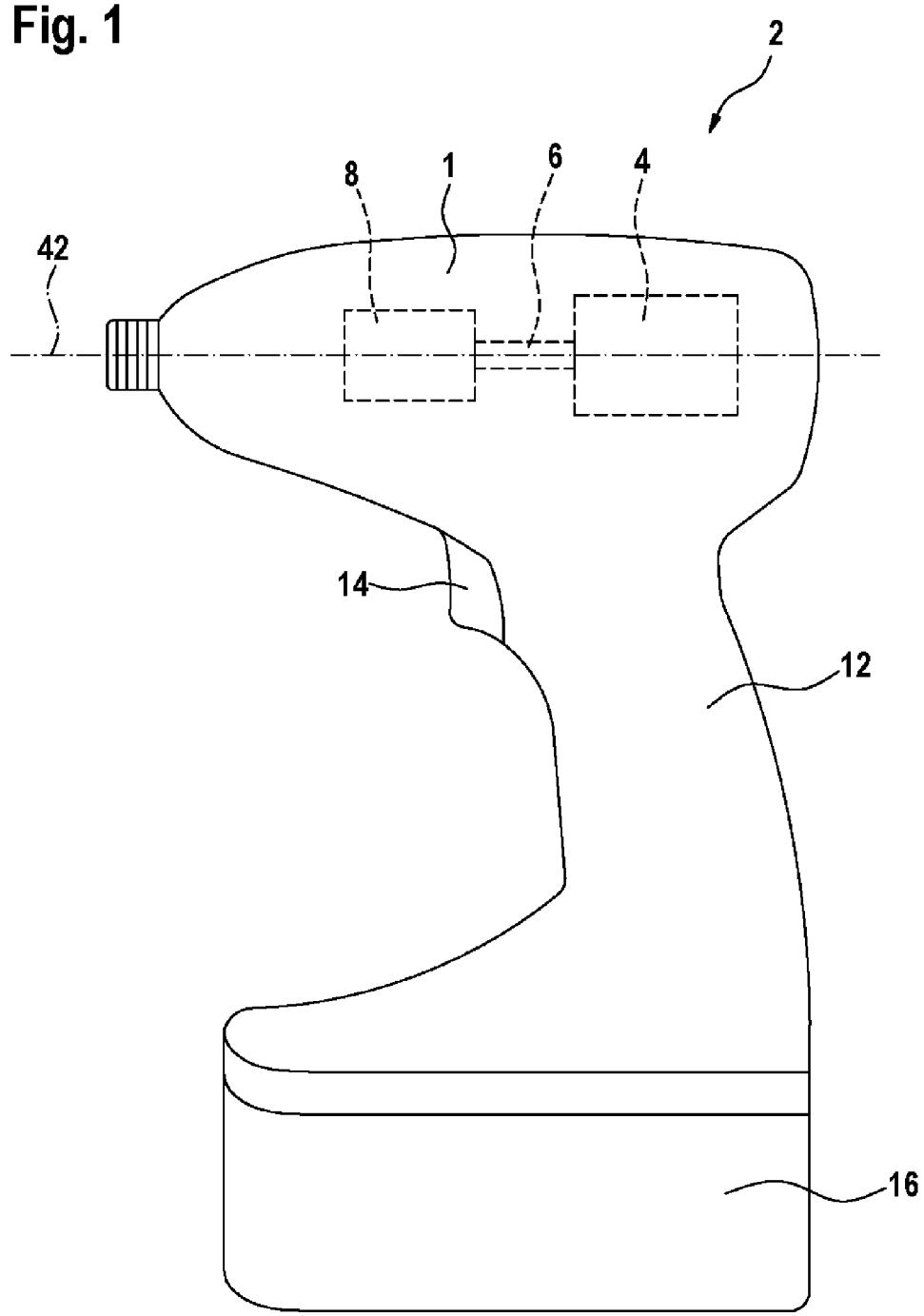
FIG. 1 is a schematic drawing of a side view of a rotary tool according to the present invention.

An example of a rotary power tool according to the present invention is illustrated in FIG. 1. While the illustrated embodiment will be recognizable to those skilled in the art as an impact driver, the invention may be advantageously used with any sort of rotary power tool irrespective of whether or not it has an impact function. Within housing 1 of a rotary power tool 2 is a motor 4 and an associated motor shaft 6. A transmission 8 converts the rotation of the motor shaft 6 into increased output torque, but correspondingly reduced speed rotation of the driveshaft 10. The driveshaft 10 is coupled with, or may be alternatively contiguous with an output shaft 11. The tool is provided with a handle 12 and a trigger 14 so that it may be conveniently operated by a user. The power source is a DC battery 16 in this exemplary cordless tool, but an AC power source is a standard alternative.

Figure 2:
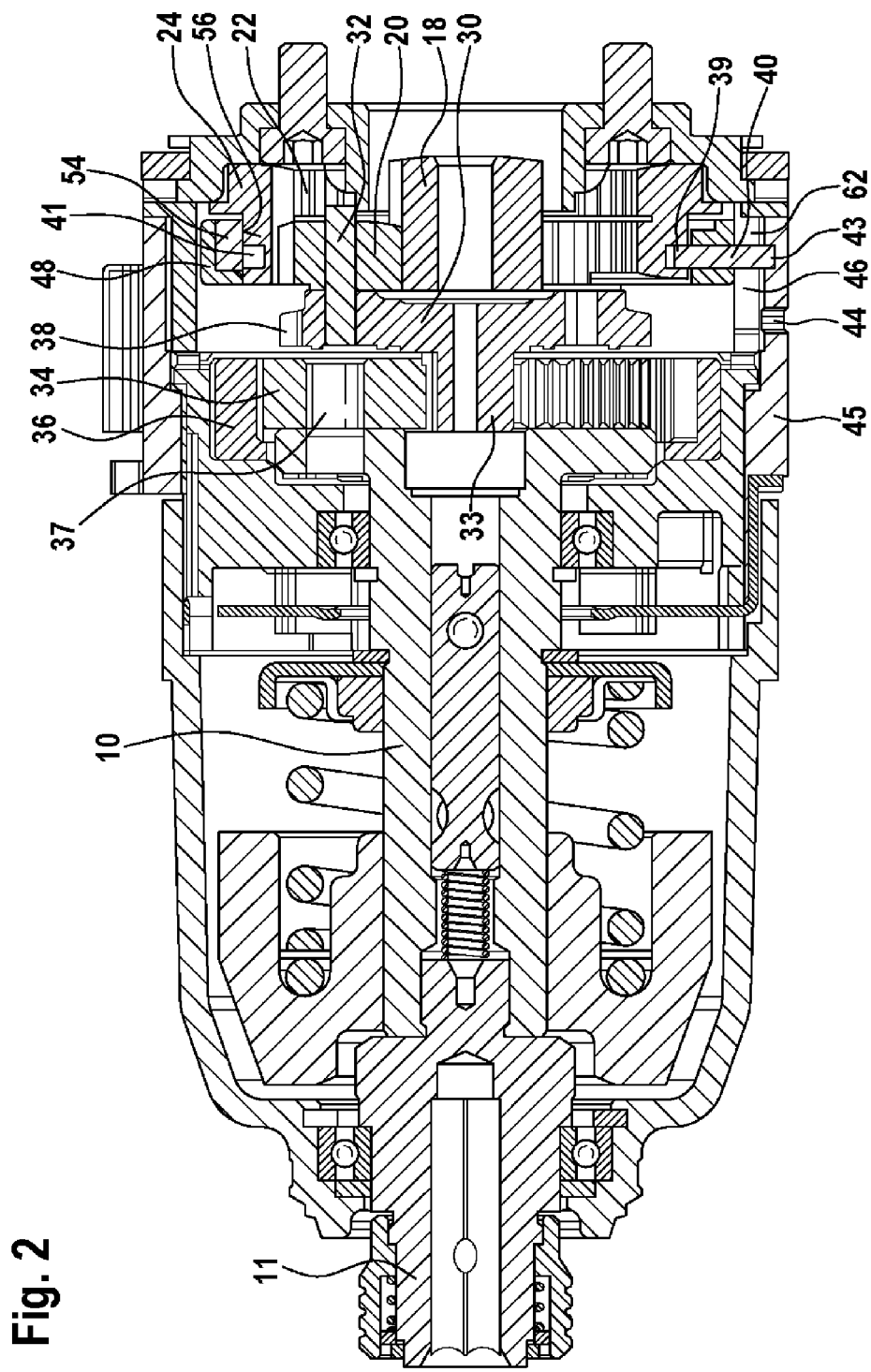
FIG. 2 is a section view of a rotary tool in low speed mode.

FIG. 2 is a section view of the rotary power tool 2 operating in low speed mode. The motor shaft 6 is contiguous with, or is directly coupled with a first sun gear 18 which is associated with a first set of planet gears 20. The internal gear surface 22 of an adjustable ring gear 24 also cooperates with the planet gears 20. As such the adjustable ring gear 24 and the planet gears 20 are in direct contact. In this mode, the adjustable ring gear 24 is not free to rotate, since it is in a first position wherein its external gear surface 26 is mated with a complementary gear profile 28 (visible in FIG. 3) in the housing.

The housing is preferably a polymer material and is sufficient to immobilize the adjustable ring gear 24 when it is part of the first stage of speed reduction. More structural strength in the means for immobilizing the adjustable ring gear 24 is preferred if it were a component of the second stage of speed reduction since there would be magnified output torque associated with the adjustable ring gear 24. For example, the complementary gear profile 28 could alternatively be constructed in a metal housing, or a component projecting from a metal housing could be received in a cavity in the adjustable ring gear 24.

A carrier gear 30 which is driven by rotation of pins 32 which are supporting the planet gears 20 will rotate at reduced speed relative to the first sun gear 18, in this case preferably a speed reduction factor of approximately 3 to 4 times.

A second stage of gear reduction begins with a second sun gear 33 located on the opposite face of the carrier gear 30. A second set of planet gears 34 rotates within fixed ring gear 36. Pins 37 on the driveshaft 10 carry and are driven by the planet gears 34, in this case preferably with a speed reduction factor of approximately 6 to 8 times.

Figure 3:
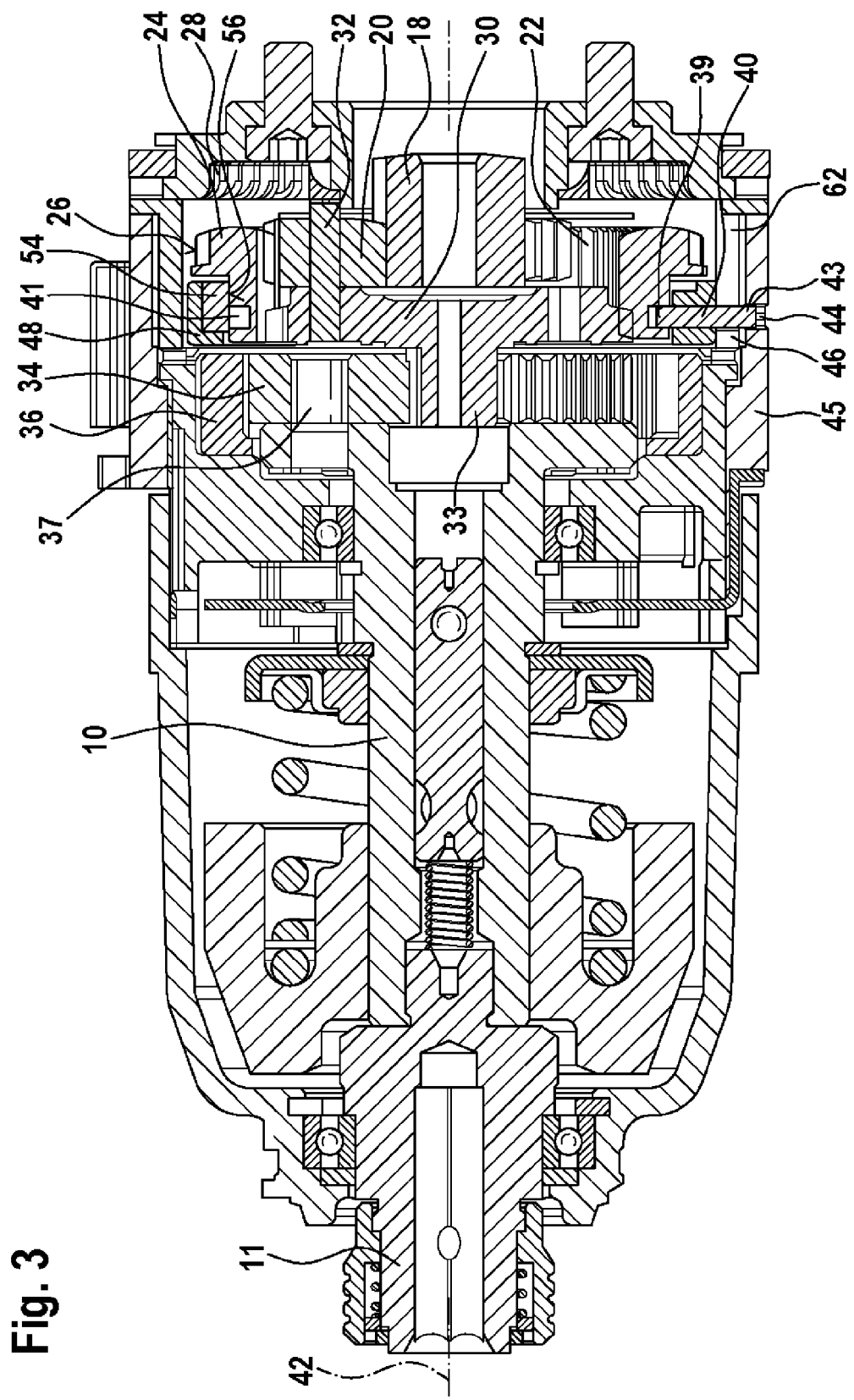
FIG. 3 is a section view of a rotary tool in high speed mode.

FIG. 3 is a section view of the rotary power tool 2 operating in high speed mode. Here the external gear surface 26 of the adjustable ring gear 24 is in a second position wherein it is not engaged with the complementary gear profile 28 in the housing. At the same time its internal gear surface 22 is engaged with an outer gear profile 38 of the carrier gear 30. Since the planet gears 20, adjustable ring gear 24 and carrier gear 30 are effectively coupled, the carrier gear 30 and the adjustable ring gear 24 take on the high speed of the first sun gear 18. The first stage of planetary gear reduction is effectively cancelled, and therefore the tool operates in high speed mode.

Figure 4:
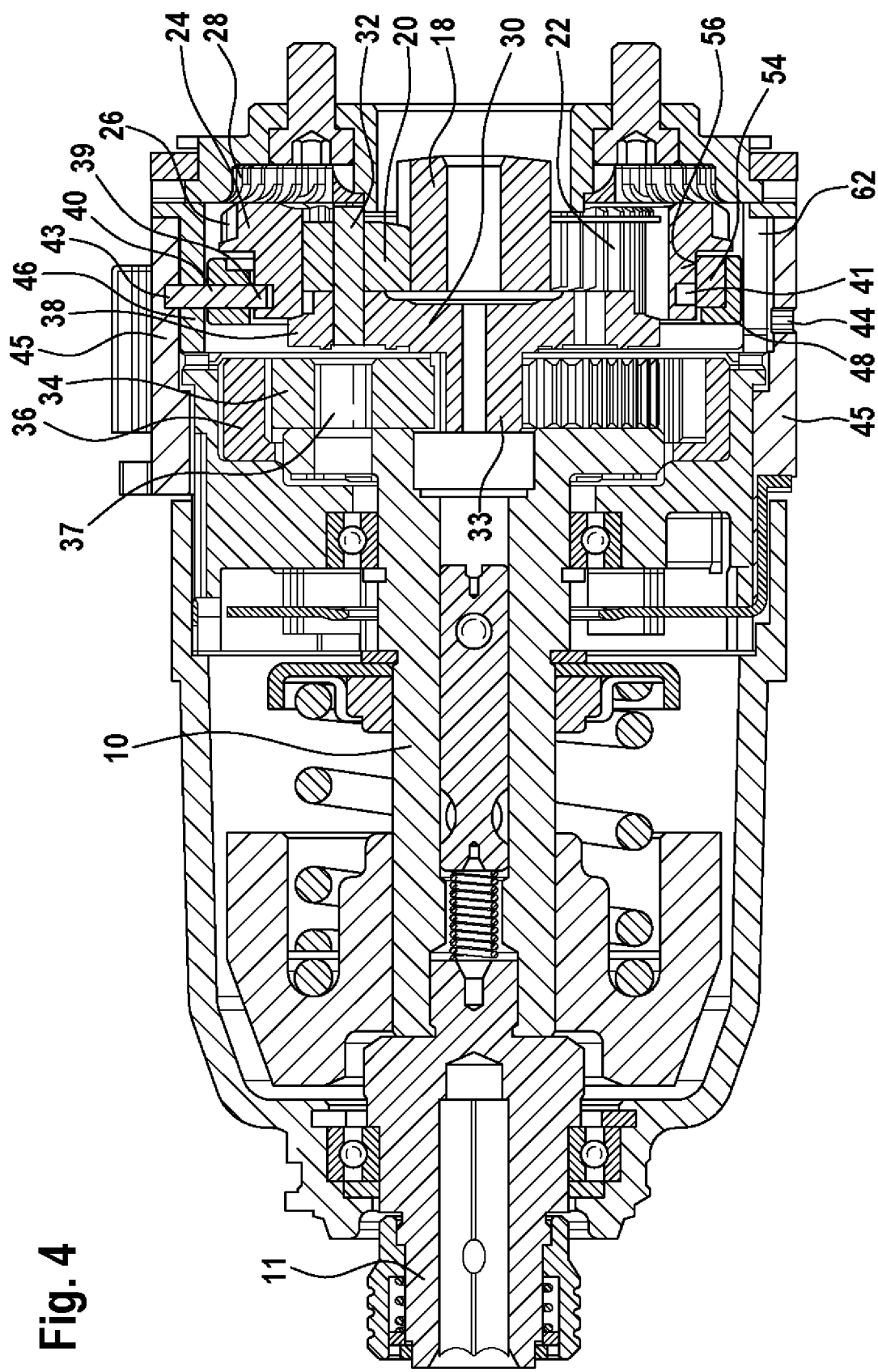
FIG. 4 is a section view of a rotary tool in neutral speed mode.

A third mode of operation is illustrated in the comparable section view of FIG. 4. Here the adjustable ring gear 24 is in a third position wherein it is neither engaged with the complementary gear profile 28 in the housing nor with the outer gear profile 38 of the carrier gear 30. Since the sun gear 18, planet gears 20, and adjustable ring gear 24 are all free to rotate in this configuration, no torque is transmitted to the pins 32 of the carrier gear 30. The tool therefore operates in neutral speed mode, wherein none of the torque output of the motor 4 is transmitted downstream to the driveshaft 10 and output shaft 11. Nevertheless the adjustable ring gear 24 rotates at high speed in this mode, driven by the rotating but non-orbiting planet gears 20.

The neutral speed mode has potential utility as a safety feature. If the user were to accidentally engage the trigger 14, the output shaft 11 would not rotate when this mode is selected. Biasing means such as springs could be provided for acting on the adjustable ring gear 24 or other associated structures to make this mode the default mode absent further actions by the user. However, since the adjustable ring gear 24 rotates at high speed in this mode, similar issues as in the high speed mode are presented, in so far as providing means for supporting the gear and for minimizing friction.

The first ends 39 of pins 40 are received in a circumferential groove 41 in the adjustable ring gear 24 and can serve as axial adjustment means for moving the adjustable ring gear 24 axially into the first, second or third position. Since they travel within the groove 41, the pins 40 allow the adjustable ring gear 24 to rotate about the axis of rotation 42 of the adjustable ring gear 24, but they may also be used to exert an axial force to urge the adjustable ring gear 24 to move along its axis of rotation 42.

Figure 7:
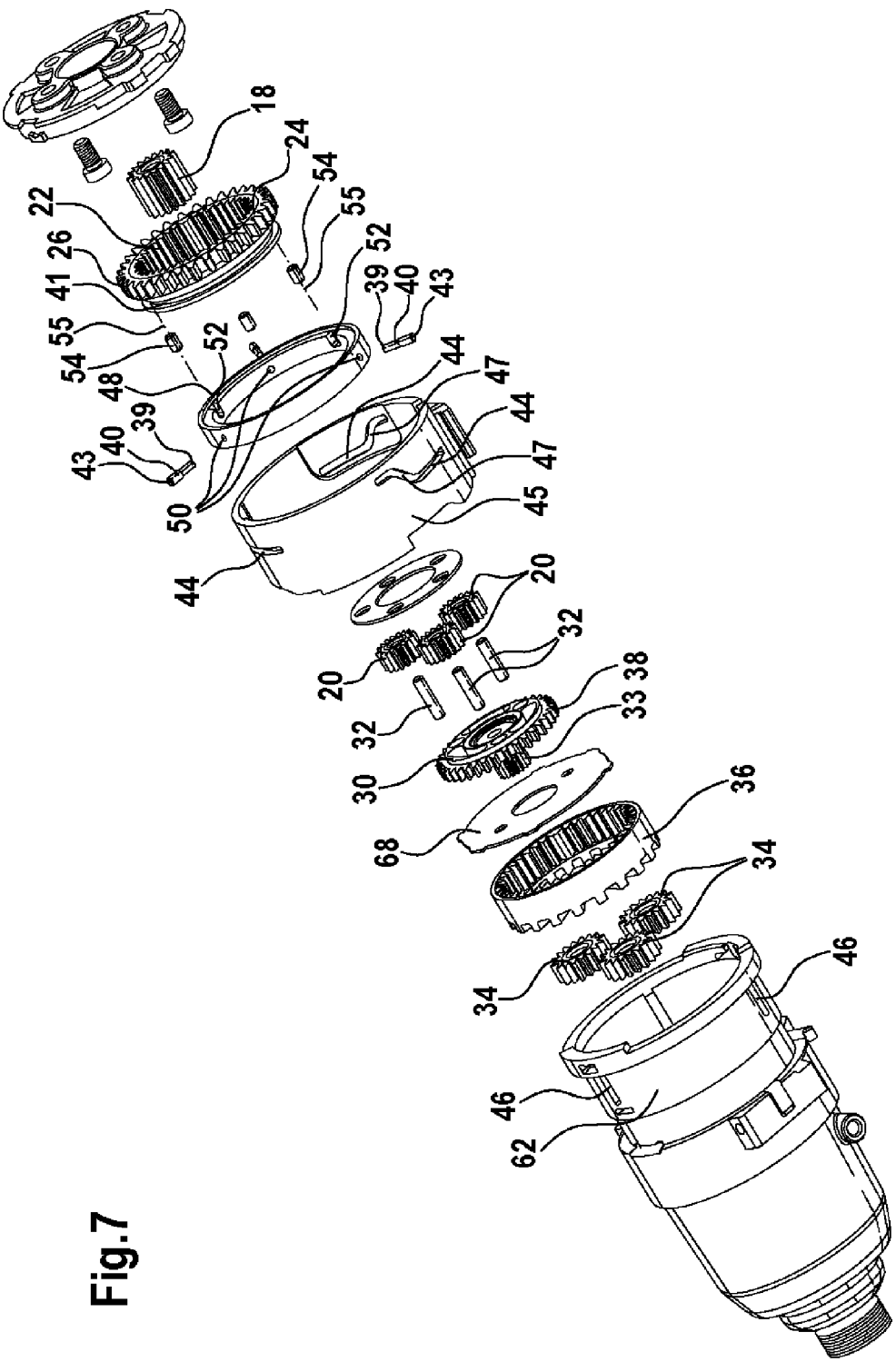
FIG. 7 is an exploded perspective view of an inner mechanism of a rotary tool.

The opposite ends 43 of the pins 40 pass through openings 46 present in the gear housing 62 to engage with further slots 44 in a rotatable sleeve 45 mounted to the external housing 1. When the sleeve 45 rotates, cam surfaces 47 in the slots 44 in the sleeve 45 urge the pins 40 to move axially (see FIG. 7). By acting on the pins 40, the sleeve 45 may be also said to comprise axial adjustment means for adjusting the position of the adjustable ring gear 24.

Without further support, rotation of the adjustable ring gear 24 in high speed mode or neutral mode may generate vibrations and vibration-associated noise due to loose alignment. To further support the adjustable ring gear 24, a support member in the form of a support ring 48 is coupled to the adjustable ring gear 24 via the pins 40. The pins 40 are press fit through holes 50 in the support ring 48. The coupling permits the support ring 48 to remain stationary even when the adjustable ring gear 24 rotates, but the two parts will always move together in the axial direction when the pins 40 are adjusted axially via the sleeve 45.

Figure 5A:
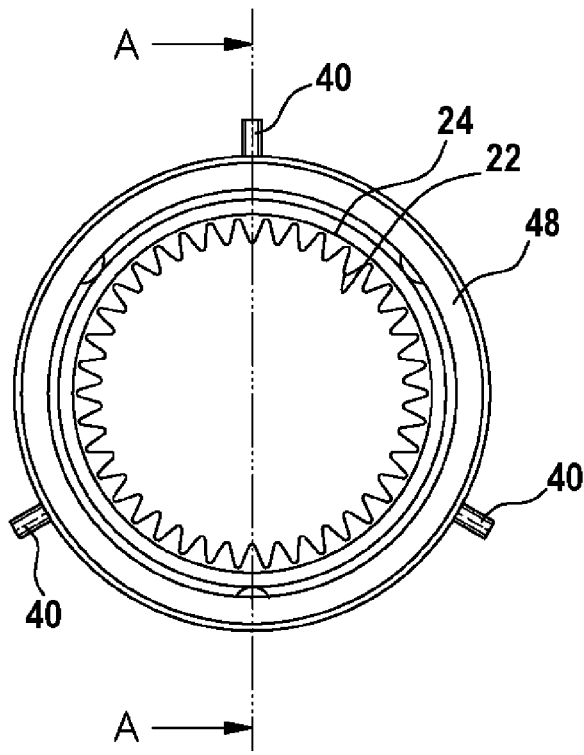
FIG. 5A is a side view of a subassembly within a rotary tool.
Figure 5B:
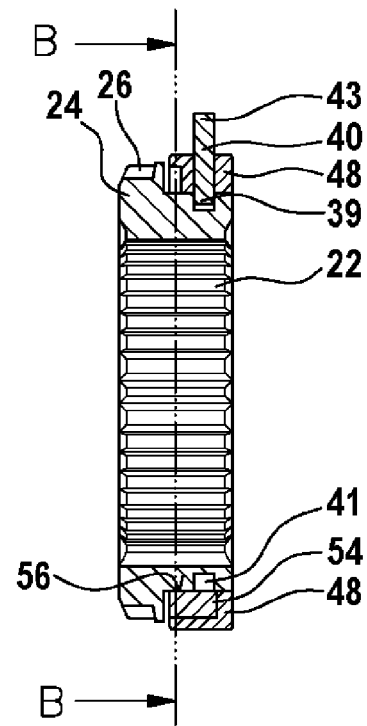
FIG. 5B is a section view of the subassembly within a rotary tool taken along section line A-A of FIG. 5A.
Figure 5C:
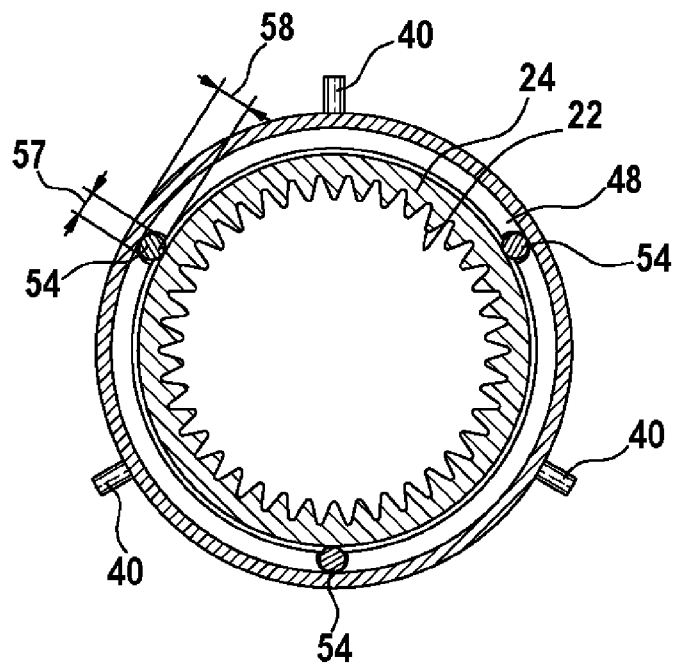
FIG. 5C is a section view of the subassembly within a rotary tool taken along section line B-B of FIG. 5B.

FIGS. 5A, 5B and 5C illustrate that stabilization of the adjustable ring gear 24 by the support ring 48 is accomplished without directly contacting the adjustable ring gear 24. The support ring 48 is provided with recesses 52 into which bearing members, realized as rollers 54, are provided. The rollers 54 are cylindrically shaped and are free to rotate within the recesses 52 along a roller axis of rotation 55 as the adjustable ring gear 24 rotates. Rolling is facilitated by providing the recesses 52 with grease during assembly. A smooth circumferential surface 56 of the adjustable ring gear 24 makes line contact with each of the rollers 54. The support ring 48 and the adjustable ring gear 24 therefore form cages 53 which trap the rollers 54. Preferably three rollers 54 are used to help support the adjustable ring gear 24, but it is also possible to use less or more than three. Less than three are a possibility since the rollers 54 do not act alone in supporting the adjustable ring gear 24.

FIG. 5C illustrates that a cross section perpendicular to the roller axis of rotation 55 can be used to determine a roller diameter 57. Similarly, such a cross section also allows measurement of a support ring thickness 58 in the vicinity of the roller diameter 57. The roller diameter 57 is preferably about 50 to 75 percent of the support ring thickness 58. The roller axis of rotation 55 preferably lies within the support ring thickness 58 so that the recesses 52 receive more than fifty percent of the roller 54.

The bearing members, in this case the rollers 54, are preferably separate parts from the support ring 48. However, since the bearing members are at least partially within the support ring thickness 58 and in cross section appear to project from the support ring 48 towards the adjustable ring gear 24, they can be said to protrude from the support ring 48 in the direction of the adjustable ring gear 24. In alternative constructions wherein the bearing members are intrinsic parts of the support ring 48, the bearing members, relative to other portions of the support member, also preferably protrude from the support ring 48 in the direction of the adjustable ring gear 24.

In the preferred construction, the bearing members are fixed radially relative to the adjustable ring gear 24. That is, the roller axis of rotation 55 generally does not orbit around the gear axis of rotation 42 as would be the case if a precision ball bearing were used. Though they may rotate along their axis, the bearing members stay fixed in overall position along with the stationary support member.

Bearing members may alternatively be provided not on the support member, but instead on the adjustable ring gear 24. The bearing members would preferably contact a circumferential surface of the support member. In this alternative, the bearing members are not fixed in position, and if they were arranged in cavities in the adjustable ring gear 24, they would move relative to the stationary support member. Furthermore the roller axis for rotation 55 would orbit around the gear axis of rotation 42.

It is possible also to have a hybrid construction wherein bearing members protrude from each of the support member and the adjustable ring gear 24. Such bearing members would take on different axial positions relative to the rotational axis 42 so that the adjustable ring gear 24 is free to rotate without collision between the bearing members while the support member is stationary.

Bearing members with other shapes are also contemplated. For example, the bearing members could be spherical or they could be cylindrically shaped but with a variable diameter, such as a dumbbell shape. Other bearing members that are not cylindrical or spherical are possible, for example with a diamond shape or other polygonal shape. Even irregularly shaped bearing members are possible. However these shapes would function better if the adjustable ring gear 24 were provided with a cooperating groove to receive corresponding protruding aspects of the bearing members. The recesses 52 in the support ring 48 could also be specially configured to receive such bearing members and optionally permit them to rotate.

As mentioned previously, the bearing members may alternatively be unitary with the support ring 48, comprising protrusions taking on comparable profiles near the support ring 48. Of course such bearing members would not be free to rotate, and so there would be more friction at the point of contact and therefore this aspect would be more subject to wear. The pins 40 themselves could function not only as axial adjustment means, but also as bearing members. The first ends 39 of the pins and the circumferential groove 41 of the adjustable ring gear 24 would be sized and shaped to contact each other along the basin of the circumferential groove 41, so as to provide not just axial support but also radial support.

Rather than utilize distinct members, a single unitary construction made out of plastic, for example, could be manufactured to embody all the features of the support member, the axial adjustment means, and the bearing members. Such a construction could take on a shape similar to the preferred embodiment.

The bearing members preferably contact the circumferential surface 56 of the adjustable ring gear 24, but they may alternatively positioned to contact a lateral face of the adjustable ring gear 24, where they would work in conjunction with the axial adjustment means to stabilize the adjustable ring gear 24.

The subassembly illustrated in FIGS. 5A-C is comprised of the pins 40, support ring 48, rollers 54 and adjustable ring gear 24, and these elements are coupled together, such that all the items move together axially whenever the adjustable ring gear 24 is moved into the first, second or third positions. Therefore, the entire assembly is in a first position in FIG. 2, in a second position in FIG. 3, and in a third position in FIG. 4.

Besides stabilizing the adjustable ring gear 24 to reduce vibration, the support ring 48 is also insulating means for insulating the gear housing 62 from the heat generated by friction between the adjustable ring gear 24 and the rollers 54 or the pins 40. Although it is minimized by having only line contact between the adjustable ring gear 24 and the rollers 54, heat is generated when the adjustable ring gear rotates 24 at high speeds. There is also friction between the pins 40 and the adjustable ring gear 24 when it is rotating at high speeds. In these respects, it is preferable if the support ring 48 is constructed of a highly conductive material such as metal so that it can serve as heat sink means for radiating heat generated by the rollers 54 or pins 40.

The preferred shape of the support member is not meant to be restrictive and other shapes, including more elaborate shapes incorporating fins or the like are also contemplated, particularly since they could increase the efficacy of the heat sink means. The support member does not need to take on the ring shape of the support ring 48, and other more irregular shapes such as with generally square or polygonal cross sections are possible so long as the support member stabilizes the adjustable ring gear 24 in conjunction with the bearing members.

Figure 6:
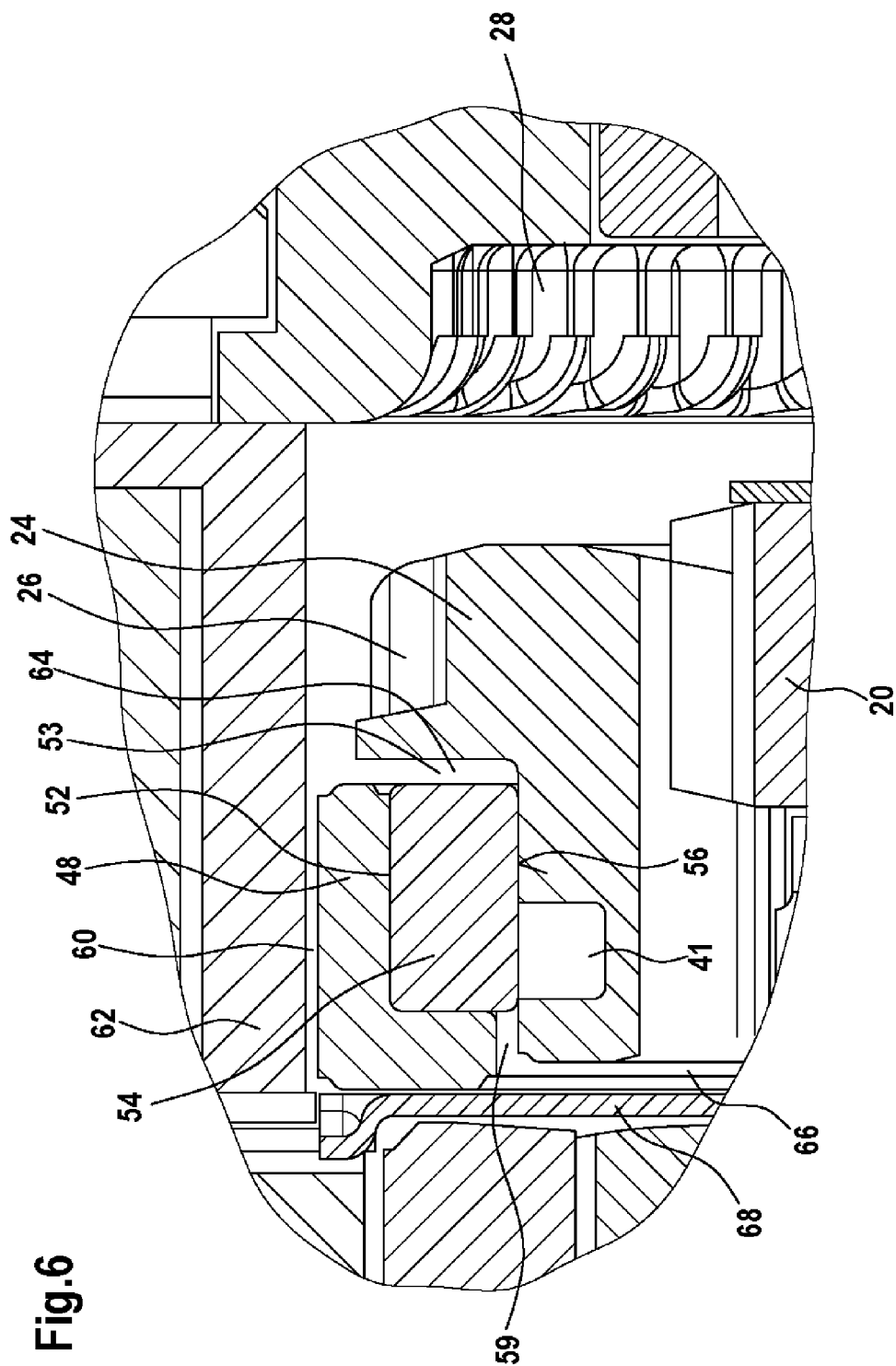
FIG. 6 is a detail section view of FIG. 3.

Air gaps have been included in the inventive design to minimize friction or provide insulation (See FIG. 6). For example, there is no direct contact between the smooth circumferential surface 56 of the adjustable ring gear 24 and the support ring 48 due the defined air gap 59 between them. An air gap 60 is present between the support ring 48 and the gear housing 62 for insulation purposes and to allow clearance for axial sliding. There is also an air gap 64 which permits some play in the axial direction by the rollers 54 so that they do not jam or clamp between the adjustable ring gear 24 and support ring 48. Finally, even when the adjustable ring gear 24 is in the second position, the positioning of the adjustable ring gear 24 in the support ring 48 ensures that there is an air gap 66 sufficient to insulate the adjustable ring gear 24 from a washer 68 that helps support the second set of planet gears 34.

Figure 8A:
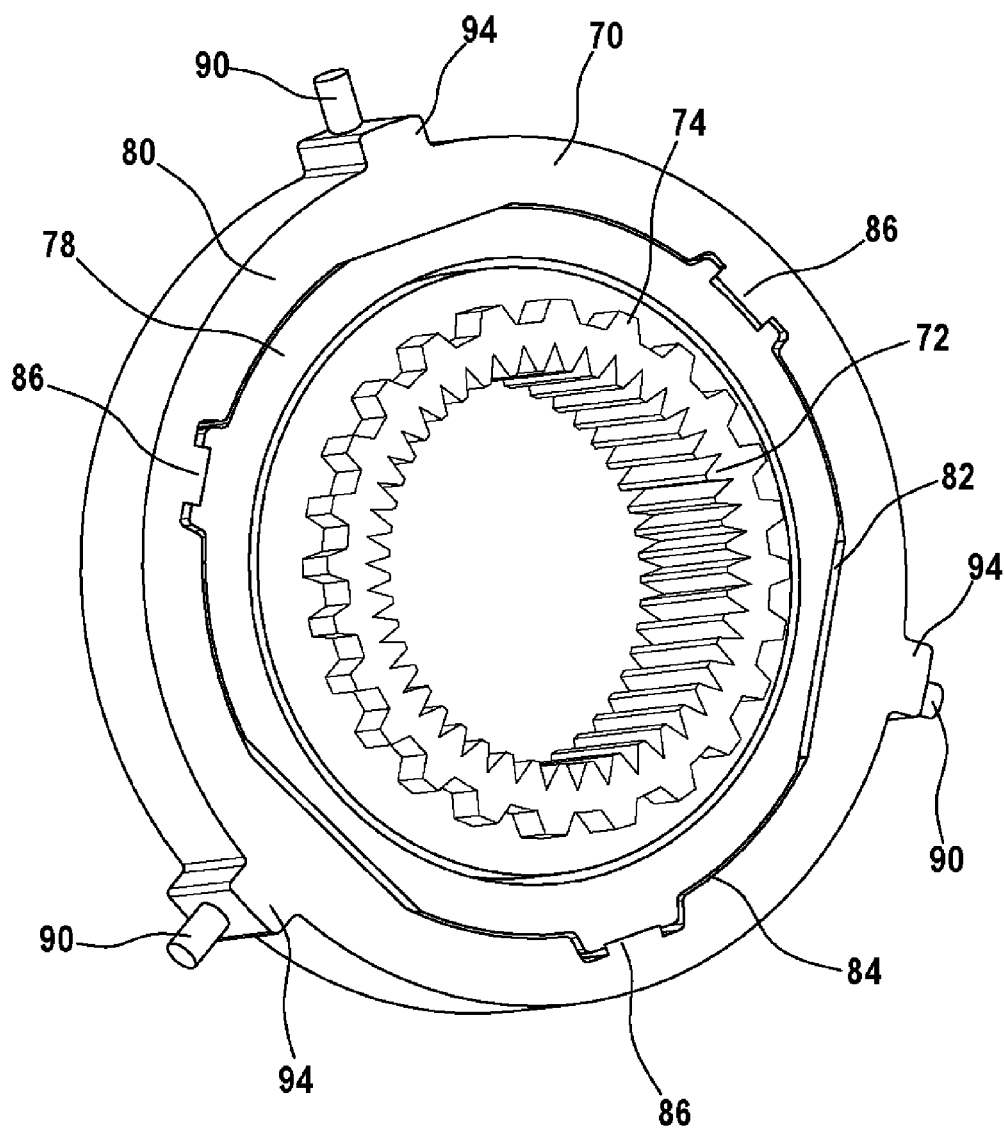
FIG. 8A is a perspective view of a second embodiment for a subassembly within a rotary tool.
Figure 8B:
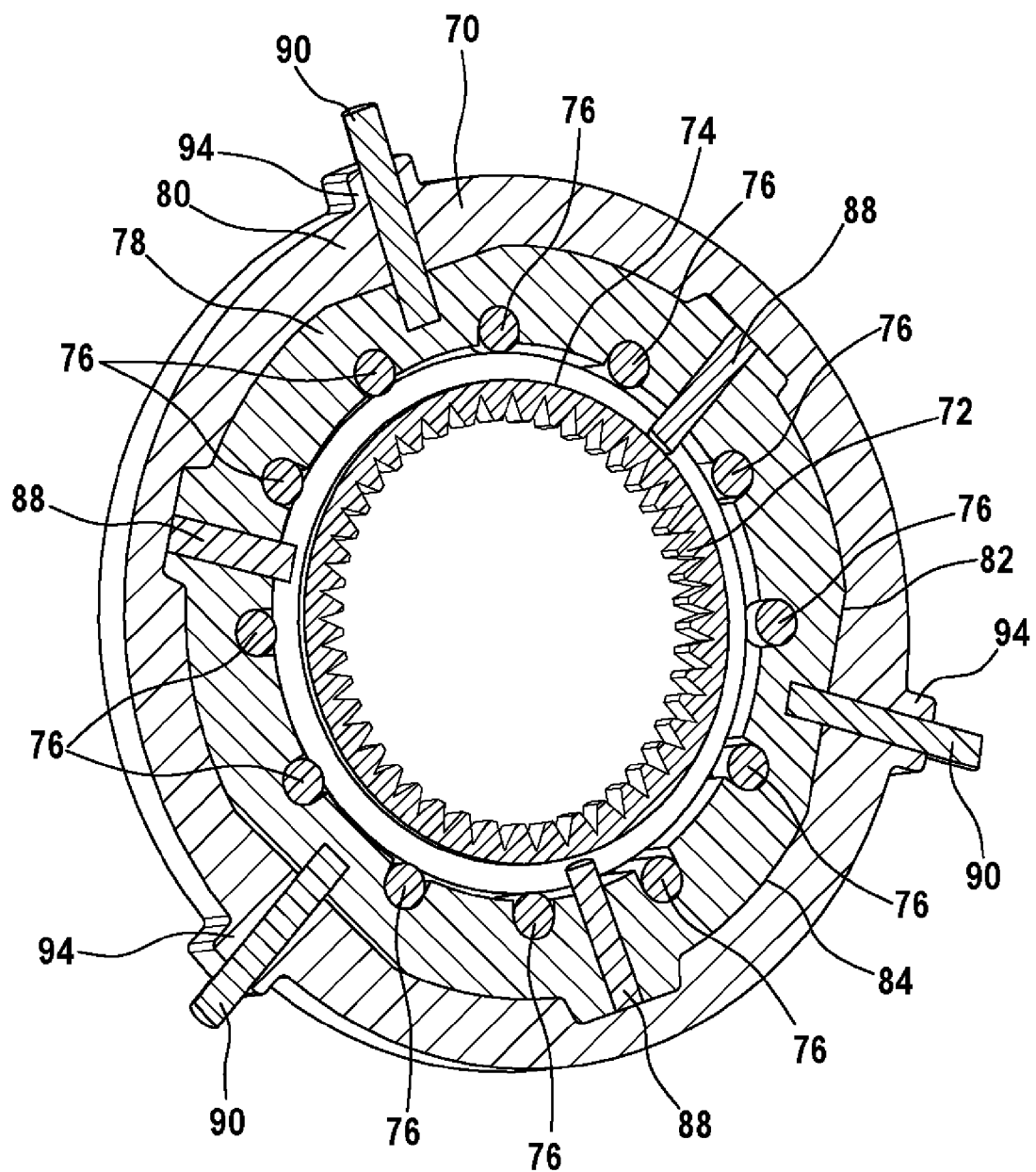
FIG. 8B is a perspective sectional view of a second embodiment for a subassembly within a rotary tool taken along a plane parallel with the long diameter of the subassembly.
Figure 8C:
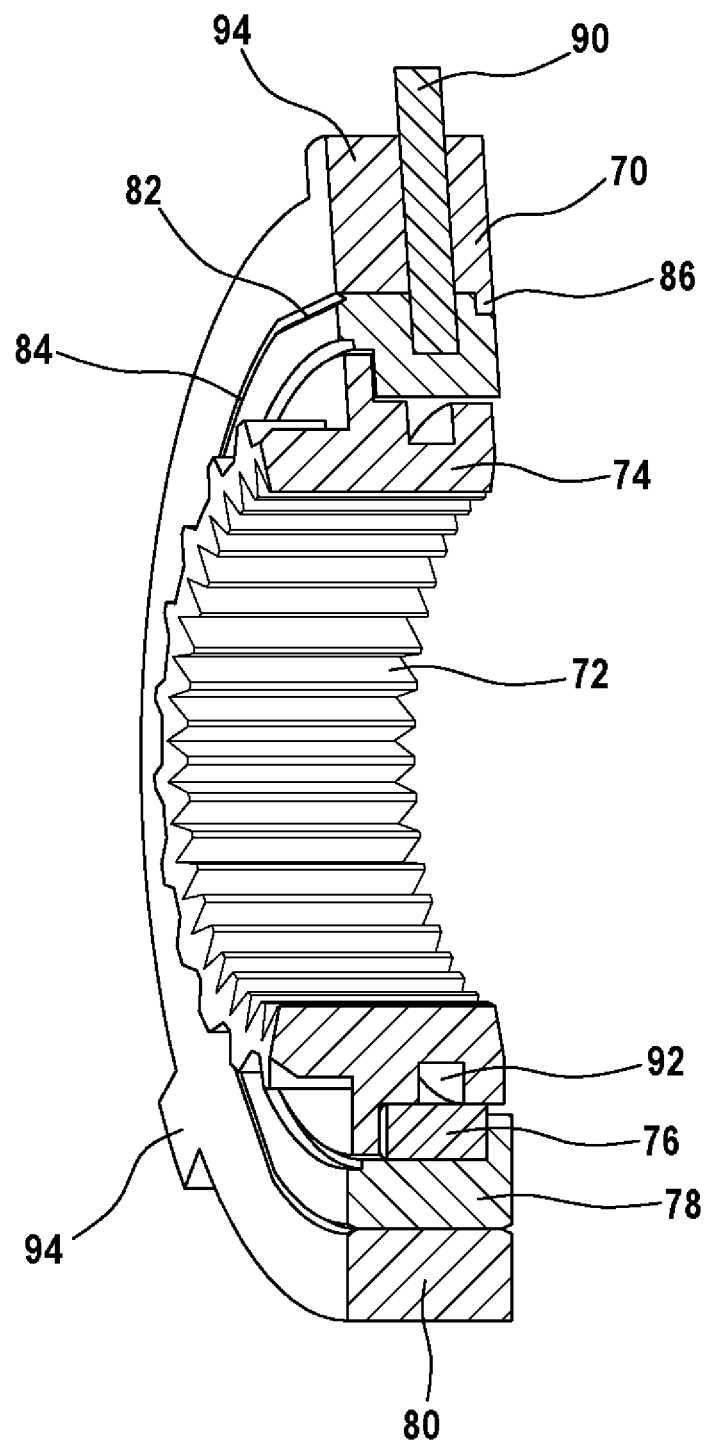
FIG. 8C is a perspective sectional view of a second embodiment for a subassembly within a rotary tool taken along a plane perpendicular to the long diameter of the subassembly.

FIGS. 8A, 8B, and 8C illustrate a second embodiment for a subassembly including a support ring 70. This subassembly can be substituted for the one in FIGS. 5A, 5B, and 5C, without substantial changes to other aspects of the tool. In this embodiment, several parameters have been modified for the purpose of minimizing the amount of vibration, the absolute temperature increase, and the rate of temperature increase during operation of the tool. As a consequence, this embodiment requires less power to operate in comparison with the first embodiment.

In comparison with the first embodiment, the gear teeth 72 in the first planetary reduction stage, comprising the ring gear 74, planetary gears (not shown), and sun gear (not shown) are smaller (0.5 mm module) than those in ring gear 24, planetary gears 20 and sun gear 18 (0.7 mm module). Since the number of gear teeth 72 is the same, each gear has a smaller external diameter, and since the angular velocity is the same as in the first embodiment, the linear velocity is reduced, thereby reducing vibration. These benefits of a smaller module should be balanced against certain corresponding disadvantages. If the module is reduced, the teeth are thinner and are more subject to fatigue or failure. Also for a given level of quality, smaller module gear sets tend to be more expensive to produce.

The second embodiment utilizes five planetary gears (not shown) rather than three. Twelve rollers 76 are used as bearing members in this embodiment. While these differences provide certain advantages, these must be balanced against various drawbacks, in so far as more planetary gears would cost more and more bearing members means there will be corresponding increases in the amount of friction with the ring gear 74. However, when considering the power loss associated with the friction, the power losses to vibration tend to greater and therefore outweigh this disadvantage. Although incorporating more than twelve bearing members is also possible, to a certain extent the possibility of increasing the number of rollers 76 even further is limited based on space limitations as to how many bearing members can be accommodated by the support ring 70.

To minimize the overall vibration in the system, it is preferred if the number of planetary gears and the number of rollers 76—in this case five and twelve, respectively—do not share a common factor, so that vibrational frequencies associated with each category of parts will be less likely to phase lock, leading to an enhanced vibration amplitude at certain frequencies.

As discussed before, during operation of the tool, there is a clearance 60 between the support ring 70 and the gear housing 62. However, this is only the case when the ring gear 74 around which the support ring 70 is mounted actually is centered about the axis of rotation 42. Since there is some flexibility in the system, due to gravity or other factors, the support ring 70 may nevertheless contact the gear housing 62. This will lead to transmission of heat or vibration to the housing 62. To mitigate this, the support ring 70 in this embodiment is made up of a metal inner ring 78 and a plastic outer ring 80. The plastic outer ring 80 helps to absorb vibrations passed on from the ring gear 74 through the rollers 76 to the inner ring 78. The metal inner ring 78 serves as heat sink means, and the plastic outer ring 80 as heat insulating means since it insulates heat generated in the metal inner ring 78 from contact between the ring gear 74 and the rollers 76.

So there is no slipping between outer ring 80 and inner ring 78, the parts are irregularly shaped, for example by mixing flat 82 and curved 84 surfaces at their interface. Projections 86 act against displacement in the axial direction.

To provide insulation from the heat generated by the axial adjustment means which travel within the ring gear 74, the pins 40 of the first embodiment are replaced with an inner pin 88 within the metal inner ring 78 and the outer pin 90 within the plastic outer ring 80. Both pins 88, 90 are preferably made of metal, but the pins 88, 90 are also spatially separated so that heat from the inner pin 88 generated by contact with the circumferential groove 92 in the ring gear 74 is dissipated by the inner ring 78 before it can reaches the outer pin 90. In practice, the spatial separation increases the amount of time the tool must be continuously operated before the temperature of the gearbox housing 62 reaches a plateau temperature.

Although for the purposes of increasing the holding force on outer pin 90, the pin 90 penetrates outer ring 80 and contacts inner ring 78, a blind hole can alternatively be used, so that there is even greater insulation between the inner 88 and outer 90 pins. Protrusions 94 provide additional holding force on outer pin 90.

The invention claimed is:

1. A rotary power tool operable in a first speed mode and a second speed mode comprising:
a motor shaft;
a driveshaft with an axis of rotation;
a gear that is a component of a transmission for transmitting torque from the motor shaft to the driveshaft;
a support member;
at least one bearing member which contacts the gear, wherein the gear, the support member and the at least one bearing member form an assembly that is in a first position along the axis of rotation when the tool is operating in the first speed mode and is in a second position along the axis of rotation when the tool is operating in the second speed mode, and wherein at least one bearing member protrudes from the support member in the direction of the gear and rotates when the gear rotates, wherein the first speed mode is achieved by shifting the assembly at a first axial position, and wherein the second speed mode is achieved by shifting the assembly at a second axial position.

2. A rotary power tool operable in a first speed mode and a second speed mode comprising:
a motor shaft;
a driveshaft with an axis of rotation;
a gear that is a component of a transmission for transmitting torque from the motor shaft to the driveshaft;
a support member;
at least one bearing member which contacts the gear, wherein the gear, the support member and the at least one bearing member form an assembly that is in a first axial position along the axis of rotation when the tool is operating in the first speed mode and is in a second axial position along the axis of rotation when the tool is operating in the second speed mode, and wherein at least one bearing member protrudes from the support member in the direction of the gear and rotates when the gear rotates.

3. A rotary power tool according to claim 2, wherein at least one bearing member can rotate along a bearing member axis of rotation.

4. A rotary power tool according to claim 3, wherein the support member has a support member thickness and the bearing member axis of rotation is located within the support member thickness.

5. A rotary power tool according to claim 2, wherein the gear and the support member form a cage for the at least one bearing member.

6. A rotary power tool according to claim 2, wherein axial adjustment means are arranged in a circumferential groove in the gear.

7. A rotary power tool according to claim 6, wherein the axial adjustment means comprise an inner member that contacts the circumferential groove and an outer member accessible to the user for adjustment.

8. A rotary power tool according to claim 7, wherein the inner member does not directly contact the outer member.

9. A rotary power tool according to claim 2, wherein heat sink means are in contact with the at least one bearing member for radiating heat generated when the gear rotates.

10. A rotary power tool according to claim 2, wherein in either the first speed mode or the second speed mode the gear is not free to rotate and the tool operates in a low speed mode.

11. A rotary power tool according to claim 2, wherein there are at least three bearing members which form part of the assembly and wherein each of the at least three bearing members protrudes from the support member in the direction of the gear.

12. A rotary power tool according to claim 2, wherein there are at least twelve bearing members which form part of the assembly and wherein each of the at least twelve bearing members protrudes from the support member in the direction of the gear.

13. A rotary power tool according to claim 2, wherein that the support member comprises an inner heat conducting portion and an outer heat insulating portion.

14. A rotary power tool according to a claim 2, wherein the gear is a ring gear that directly contacts at least one planetary gear and wherein the number of planetary gears is five.

* * * * *